Feb. 26, 1935.  J. VALENTA  1,992,516
FROZEN CONFECTION AND HOLDER THEREFOR
Filed Sept. 2, 1931
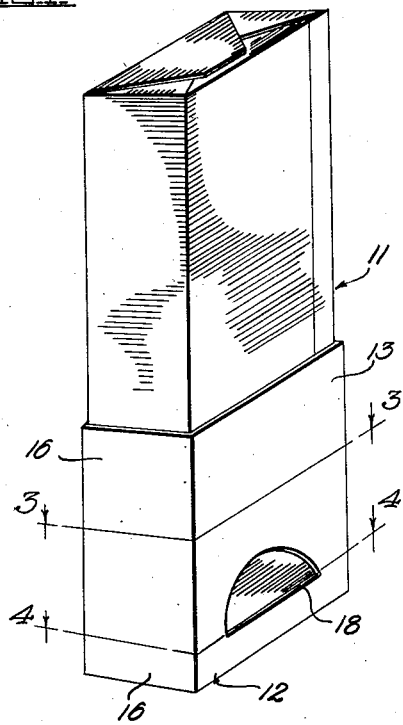
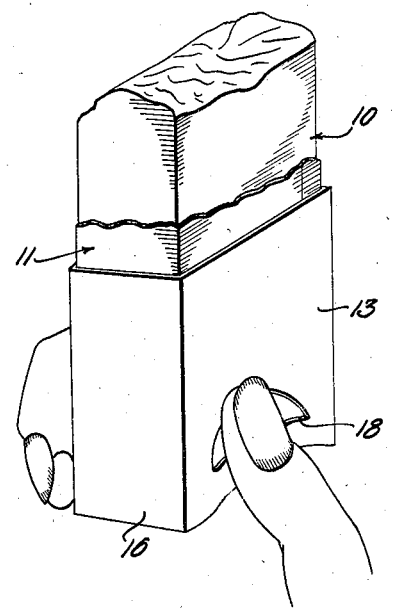
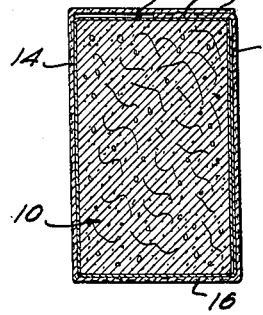
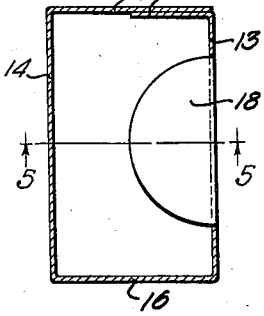
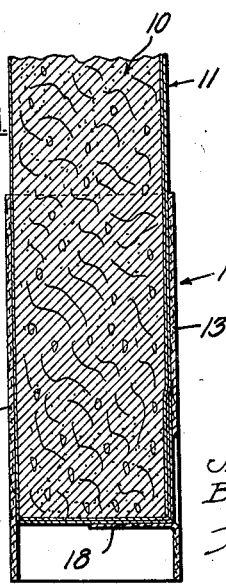
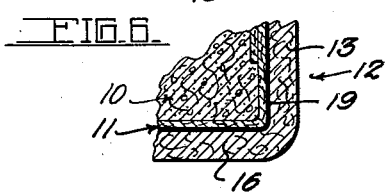
INVENTOR
J. VALENTA
By Hazard and Miller
ATTORNEYS.

Patented Feb. 26, 1935

1,992,516

UNITED STATES PATENT OFFICE 1,992,516

FROZEN CONFECTION AND HOLDER THEREFOR

Joseph Valenta, Los Angeles, Calif.

Application September 2, 1931, Serial No. 560,765

3 Claims. (Cl. 206—56)

This invention relates to improvements in articles of confection and particularly to frozen confections and holders therefor.

An object of the invention is to provide an improved frozen confection in the nature of a rectangular bar or brick of a size suitable to be eaten, which may be formed of a frozen substance, such as ice cream, ice milk, sherbet, frozen puddings, or the like. The improved confection is enclosed within a suitable wrapper and is provided with a holder arranged to fit snugly about the bar or brick, facilitating packing and shipment of the articles to the retail merchant.

An object of the invention is to provide an improved article of confection consisting of an ice cream brick or bar enclosed within a wrapper and supported within a cardboard holder, the cardboard holder serving to hold the bar or brick in an upright self-sustaining position, and acting somewhat as a heat insulator, insulating the heat of the hands from the frozen confection. The holder is deformable, and the wrapper is secured or anchored within the holder so that as the projecting end of the bar or brick is eaten, the holder may be squeezed, causing the brick to slide upwardly within the anchored or secured wrapper, thus enabling the entire bar or brick to be removed from the holder and completely consumed. The improved construction is such that in the event the bar or brick should start to melt that the liquid cannot drop through the holder and soil clothing.

With the foregoing and other objects in view, which will be made manifest in the following detailed description, and specifically pointed out in the appended claims, reference is had to the accompanying drawing for an illustrative embodiment of the invention, wherein:

Fig. 1 is a perspective view of the improved article of confection.

Fig. 2 is a perspective view of the confection after it has been partially consumed and illustrating the manner in which the bar can be removed from the holder for complete consumption.

Fig. 3 is a horizontal section taken substantially upon the line 3—3 upon Figure 1.

Fig. 4 is a horizontal section taken substantially upon the line 4—4 upon Figure 1.

Fig. 5 is a vertical section taken upon the line 5—5 upon Figure 4.

Fig. 6 is a partial view on an enlarged scale illustrating a detail.

Referring to the accompanying drawing, wherein similar reference characters designate similar parts throughout, the improved confection consists of a bar or brick 10 constituting a body of suitable frozen edible substance. This may be ice cream, ice milk, sherbet, frozen pudding, or any other edible substance. It is somewhat elongated and of such thickness and width that it can be conveniently eaten. This body of frozen edible substance is enclosed within a paper wrapper 11 which I preferably form of what is known as glacine paper. Any equivalent flexible wrapper which is preferably water proof may be employed. There is also provided a holder 12 in the form of an open ended tube, rectangular in cross section, which will snugly receive the body 10. This holder is preferably formed of cardboard or equivalent substance and is divided by fold lines or scoring into side walls 13 and 14 and end walls 15 and 16. Side wall 13 is shown as being provided with a marginal flap 17 glued or otherwise secured to the interior of end wall 15. In side wall 13 there is formed an arcuate cut defining a tab 18 which may be bent inwardly to limit the downward movement of the bar or brick through the holder. Tab 18 is foldable or bendable about a fold line at its bottom which is disposed a short distance above the bottom of the holder.

In making up the improved confection, the body 10 is first removed from the mold in which it is frozen, or it may be produced by slicing up a brick of ice cream. This bar or body is then enclosed within the flexible glacine wrapper 11 and the lower end of the wrapped bar is then dipped into a suitable adhesive. The adhesive which I prefer may be made up of starch and water, these ingredients being mixed to form a paste of suitable consistency. When the end of the bar is thus dipped in the starch paste, it is inserted in the upper end of the holder. Just prior to the insertion, the tab 18 is bent inwardly and the bar then forced down into the holder until it engages the tab. In a remarkably short time the starch paste adhesive indicated at 19 solidifies, thus securing or anchoring the lower end of the folded wrapper 11 within the holder. On eating the improved confection, the upper portion of the wrapper is opened and can be torn off, as indicated in Figure 2. The bar can then be consumed partially or down to about the level of the top of the holder. While the bar or brick is held by the holder the holder acts somewhat as a heat insulator so that the heat of the hands will not be transmitted to the body. When the bar or brick has been consumed down to about the level of the top of the holder, the bottom of the holder can be squeezed, that is the lower portions of side walls 13 and 14 may be pressed toward each other. This pressure on the bar or brick 10 causes the bar or brick to slide upwardly within the wrapper, the wrapper remaining secured to the holder. In this manner the very bottom of the bar or brick can be removed from the holder and from the wrapper and be completely consumed. As the lower end of the wrapper is folded and is effectively sealed by the coating of starch paste, it is impossible for any melted substance to drip through the wrapper. Instead the wraper within the holder acts as a type of cup retaining all liquid.

From the above described construction it will be appreciated that an improved article of confection has been devised which is of simple construction and which may be easily and quickly manufactured. The rectangular shape of the complete article facilitates packing and storing and the holder provides a means for conveniently holding the body 10 while it is being consumed. The use of starch paste, which is virtually tasteless, is preferable because it will in no way contaminate or impart a disagreeable taste to the body.

Various changes may be made in the details of construction without departing from the spirit or scope of the invention as defined by the appended claims.

I claim:

1. An article of confection comprising an elongated body of frozen edible substance, a flexible water proof wrapper therefor, a tubular cardboard holder into which the lower end of the wrapped body extends, a tab bent inwardly from the holder to limit the downward movement of the body therethrough, and adhesive securing the wrapper to the interior of the holder.

2. An article of confection comprising a tubular holder formed of deformable material, an upright bar of edible substance, a relatively thin wrapper surrounding the bar, there being an inwardly extending flap extending inwardly from one of the walls of the holder, the bar and wrapper having their lower ends positioned in the holder, and the wrapper being adhesively secured to the walls of the holder and the flap.

3. A holder for frozen confections comprising an open-ended cardboard tube of rectangular cross section and of a size and shape to snugly receive the bottom of a frozen confection, there being a tab formed in a side of the tube which is bendable inwardly about a fold line at its bottom above the bottom of the tube, said tab extending at least half way across the tube so as to form a bottom for the holder.

JOSEPH VALENTA.